US008390428B2

(12) United States Patent  
Zimmerman (10) Patent No.: US 8,390,428 B2
(45) Date of Patent: Mar. 5, 2013

(54) IDENTITY VERIFICATION BADGE AND SECURITY SYSTEM

(75) Inventor: Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 12/120,865

(22) Filed: May 15, 2008

(65) Prior Publication Data

US 2009/0284347 A1 Nov. 19, 2009

(51) Int. Cl.
*G05B 19/00* (2006.01)
*G06F 7/00* (2006.01)
*G08B 29/00* (2006.01)

(52) U.S. Cl. ............................ 340/5.81; 341/20; 341/23
(58) Field of Classification Search .............. 340/5.81; 341/20, 23
See application file for complete search history.

(56) References Cited

U.S. PATENT DOCUMENTS

| | | | |
|---|---|---|---|
| 4,906,853 A | 3/1990 | Linwood | |
| 5,017,794 A | 5/1991 | Linwood | |
| 5,027,314 A | 6/1991 | Linwood | |
| 5,119,104 A | 6/1992 | Heller | |
| 5,245,559 A * | 9/1993 | Lapeyre | 708/174 |
| 5,276,496 A | 1/1994 | Heller | |
| 5,355,222 A | 10/1994 | Heller | |
| 5,387,993 A | 2/1995 | Heller | |
| 5,548,637 A | 8/1996 | Heller | |
| 5,572,195 A | 11/1996 | Heller | |
| 6,104,295 A | 8/2000 | Gaisser | |
| 6,154,139 A | 11/2000 | Heller | |
| 6,255,951 B1 * | 7/2001 | De La Huerga | 340/573.1 |
| 6,838,992 B2 | 1/2005 | Tenarvitz | |
| 7,180,420 B2 | 2/2007 | Maurer | |
| 2002/0095586 A1 * | 7/2002 | Doyle et al. | 713/186 |
| 2003/0159044 A1 * | 8/2003 | Doyle et al. | 713/176 |
| 2006/0290519 A1 * | 12/2006 | Boate et al. | 340/573.4 |
| 2007/0250920 A1 * | 10/2007 | Lindsay | 726/7 |

OTHER PUBLICATIONS

R.G. Fogg and J.J. Hernandez, Proximity Activated Computer Console Lock, IBM Technical Disclosure Bulletin, vol. 35, No. 6, pp. 173-176, Nov. 1992.

* cited by examiner

*Primary Examiner* — Daniel Wu
*Assistant Examiner* — Frederick Ott
(74) *Attorney, Agent, or Firm* — Shimokaji & Assoc., PC (57) ABSTRACT

An identification and verification security badge is disclosed. The badge includes a keypad that allows the entry of user information that is monitored and verified by a processor within the badge. The processor compares an inputted personal identification number with one that is stored within a memory within the badge. When a match is found, an access code is transmitted that includes at least a badge identification code that uniquely identifies the badge. The badge also includes an on-body sensor that determines the status of the badge with respect to a user. When the sensor determines that the badge is not in close proximately to the user, then transmission from the badge is inhibited. In another aspect, when a transition from one state of the badge sensor to another state is determined, the personal identification number is required to be entered.

26 Claims, 12 Drawing Sheets

IDENTITY VERIFICATION BADGE AND SECURITY SYSTEM

BACKGROUND OF THE INVENTION

The present invention generally relates to the field of security and, more specifically, to providing a method and device for providing an identity verification.

With the advent of computers and computer networks and necessity to prevent access to the computers or networks, numerous methods of verifying the identity of a user have been developed that insures the user is authorized to access the computer, network and/or the data stored. For example, in a hospital environment, hospital accounting staff may be authorized to access the computer system but not be authorized to access patient information. Similar, doctors and nurses may be authorized to access the computer system to access patient data but not authorized to access financial data.

The computer logon process is typically the first step in preventing unauthorized access to computer systems. In the log-in or logon process, a user typically enters a keyword or password that is set by a computer system administrator or by the user. To provide maximum protection, security protocol often requires the keywords or passwords to have minimum level of complexity (e.g., a minimum number of alpha-numeric values with a mix of upper and lower case values). In addition, instructions may be provided to the user on a regular basis to change keyword or password. This creates a burden for the user as the user is burdened to create, change and retain the new passwords. In addition, the passwords may not be applicable to different systems to which the user has access, as the different systems may have different security protocols.

Another solution for allowing access to computer systems is for a user to enter a coded card into a slot accessible by the computer system. For example, a card or memory may be connected to a Universal Serial Port (USB), or serial port on the computer system. The card or memory may include a code or user identification. In another aspect of this method, the computer system receiving the code or user identification may respond to the receipt of the user information and may require the user to enter a keyword or password to verify that the card or memory is being inserted by the user authorized to use the card or memory. In another aspect, the card or memory may include a wireless transmitter, wherein a code or user information contained on the card or memory is wirelessly transmitted to the computer system. Again, the computer system may respond to receipt of user information stored on the card or memory by requesting the entry of a password or code.

Wireless identification or identity cards or badges are well-known in the art to contain an embedded passive RFID (Radio Frequency Identification) that operate in a close range (in the order of less than 4 or 5 cm) to provide a log-in or log-on capability. Longer range RFID tags may also be used to provide log-on capability. However such longer range RFID tags exhibit a present location ambiguity as the RF signals may penetrate walls or scatter off metal objects. Hence, an access may be allowed by the computer system when no access has been intentionally requested.

Numerous methods have been developed and researched to determine the position of a wirelessly transmitting identification badge to insure that the badge is proximately located to the system to which access is required. For example, Roy Want, Andy Hopper, Veronica Falcao and Jonathan Gibbons at the Olivetti Cambridge Research Labs have developed a long range active badge with an IR transmitter that periodically broadcasts an optical signal indicating a badge identification number. The badge, preferably, utilizes a tilt switch and accelerometer for switching the device on rather than a standard on-off power switch. The badge includes a light sensor to detect when the badge is in a drawer or pocket, causing the badge to stop transmitting and, thus, saving power. However, this device could also be used as a pointing device, but the technology used by the device requires the badge to be disconnected from the user and swept about in a large volume.

Another device is a personal Alert badge, produced by the company Versus, which combines infrared and RFID technology for computer system access and is further equipped with a call/alert button. Versus claims that U.S. Pat. Nos. 4,906,853; 5,017,794; 5,027,314; 5,119,104; 5,276,496; 5,355,222; 5,387,993; 5,548,637; 5,572,195; 6,104,295; 6,154,139; and 6,838,992, teach one or more aspects of the technology incorporated into the Alert badge. For example, U.S. Pat. No. 6,838,992 teaches a method and system for locating subjects and providing event notification within a tracking environment and a badge for use therein. The '992 patent further teaches that each badge transmits an infrared and RF signals of different strengths to determine the location of each badge.

U.S. Pat. No. 7,180,420 teaches a triangulation method using RF/Low Frequency (LF) and infrared signals for tracking the badges.

Cricket, a system developed by MIT (Massachusetts Institute of Technology), is another indoor location system for sensor-based computing environments. Cricket provides fine-grained location information—e.g., space identifiers, position coordinates, and orientation—to applications operational on handheld devices, laptop computers and sensor nodes. Cricket uses a combination of RF and ultrasound technologies to provide location information at attached host devices.

However, the problem associated with these methods of access to computer systems requires either the badge be removed from the user's person or that significant processing is expended to determine the location of the device.

Although the methods described above relate to allowing authorized log-on to a computer system, another potential breach in security can occur when a user leaves a computer system in which a user has been allowed authorized access, without first logging off the system. In this case, there occurs a situation wherein unauthorized access to the computer system may be achieved. Accordingly, security protocols have been developed wherein access is prohibited, i.e., locked out, after inactivity of the use of the computer has been determined for a known period of time. However, timeouts that are too short are annoying as the user may be in close proximity to the computer system and investigating a data item on the computer screen. On the other hand, if the timeout is too long, then a window of opportunity is created for a security breach (i.e., access by an unauthorized user). See, for example, "Proximity Activated Computer Console Lock," IBM Technical Disclosure Bulletin, Vol. 35, No. 6, November 1992.

In another aspect of computer systems, there arise situations wherein a user may enter the appropriate authorization codes to access one computer system in a network of computer systems and then have to again access the computer or a remote computer on the network. With the current security protocols described above, the user is again required to enter the authorization codes. For example, in a hospital situation, a health profession may be granted access to a computer system in one area and after leaving the area, to answer an emergency, for example, without logging-off, the security protocols lock out the user after a predetermined time period of inactivity and the health professional is required to re-enter the authorization codes so as to be granted access to the computer system. This is an additional burden on an already stressed individual.

As can be seen, there is a need in the industry for a security protocol method, system and device that enables a user to easily log-on to a computer system, while enabling the computer system to monitor and maintain the status of the user's need to have continued access to a computer system.

SUMMARY OF THE INVENTION

An identification and verification security badge is disclosed. The identity verification badge comprises a sensor determining and outputting of a status of said badge; a keypad assembly, comprising a faceplate including a plurality of data entry keys, said keys allowing for entry of at least one of a numeral value; a processor in communication with said sensor, said keypad and a memory, said memory including an identification code of said badge and a personal identification number associated with a user; said processor receiving an input from said keypad; determining whether said receiving input is comparable to said personal identification number; retaining an indication of matching said personal identification number; a transmitter/receiver in communication with said processor to output an access signal comprising at least said badge identification code when said received input is comparable to said personal identification number and said sensor output is in a first state.

In another aspect of the invention, a system for managing a login security protocol to a computer system is disclosed. The system comprises a on-body sensor providing an indication of a status of said badge; an identification badge including: a keypad providing at least one numerical input value; a transmitter/receiver; a processor in communication with a memory, said transmitter and said on-body sensor, said processor: receiving said badge status indication; receiving said at least one numerical input value; comparing said at least one numerical input value with a personal identification number stored in said memory; determining an access code comprising at least a code that unique identifies said identification badge, which said at least one numerical input value matches said personal identification number; and providing said access code to said transmitter/receiver for transmitting said access code when said badge status indication is in a first state.

In still another aspect of the invention, a method for managing a validation badge logon security protocol is disclosed. The method comprising receiving a status indication of an on-body sensor; receiving a numerical input value; comparing said numerical input value with a prestored identification value, said identification value uniquely identifying a user; transmitting at least a value that uniquely identifies said validation badge when said numerical input value is comparable to said prestored identification value and said status is in a first state.

These and other features, aspects and advantages of this invention of the present invention will become better understood with reference to the following drawings, description, and claims.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features describe below.

Broadly, embodiments of the present invention provide an identity verification badge and methods for incorporating the identification badge into a security system. The identity verification badge provides a wireless means of gaining access to a computer system by verifying the user and allowing select information regarding the identity of the badge and user inputs entered on the badge to be wirelessly transmitted to the computer system. After validation the badge and computer system remain in wireless communication to maintain the user in a logged-in condition, independent of any further user action as long as the badge remains in the physical possession of the user.

It would be recognized by those skilled in the art, that the invention described herein can take the form of an entirely hardware embodiment, an entirely software embodiment, or an embodiment containing both hardware and software elements. In an exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The invention is suitable for storing and/or executing program code and can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1A illustrates a front view of an exemplary faceplate 102 of an identity verification badge 100 in accordance with the principles of the invention. Faceplate 102 can represent a multifunctional numeric input device (i.e., key board) divided into a plurality of keys (in this illustrated case 12 keys) that may allow the entry of numerical values 0-9 via corresponding key entry. In addition, the keys associated with numerals 1-9 may provide for directional movement horizontally, vertically or diagonally. In addition, two special keys, "Left Button/Delete" and "Right Button/Enter," may represent special key functions that represent commands similar to those of standard keyboards. Although not shown, it would be recognized that the keys associated with the numeral "0" and "5" could also represent special keys. For example, the key associated with numeral "5" could also include a "Home" function. Other similar special functions may be associated with the remaining key(s).

In one aspect of the invention, faceplate/keyboard 102 may allow only for th input of numerical data (numerals 0-9) with a depression of an associated key. In another aspect, faceplate/keyboard 102 may allow for the input of numerical data with a short depression of an associated key and a movement control command with a longer depression of an associated key. Similarly, special keys, Left Button/Delete and Right Button/Enter, can allow for a left button and right button control command, respectively, with a short depression of the corresponding key and a Delete and Enter control command, respectively, with a longer depression of the corresponding key. As would be recognized in the art, the terms "long" and "short" are relative terms associated with a time of depression and may be determined based on a duration of key depression with respect to a predetermined time. For example, a short depression may be deemed to be any depression having a time of depression less than 10 milliseconds and a longer time may represent any depression greater than 10 milliseconds. Although 10 milliseconds is chosen as an example of a predetermined depression time, it would be within the knowledge of those skilled in the art to alter this value and, hence, such altered time values are considered to be within the scope of the invention. In another aspect, the determination of a numerical value entry or a special key entry may be made by the depression of a key in rapid succession. For example, two depressions of the same key within a predetermined time may be associated with the entry of a command rather than a numerical value.

Figure 1:
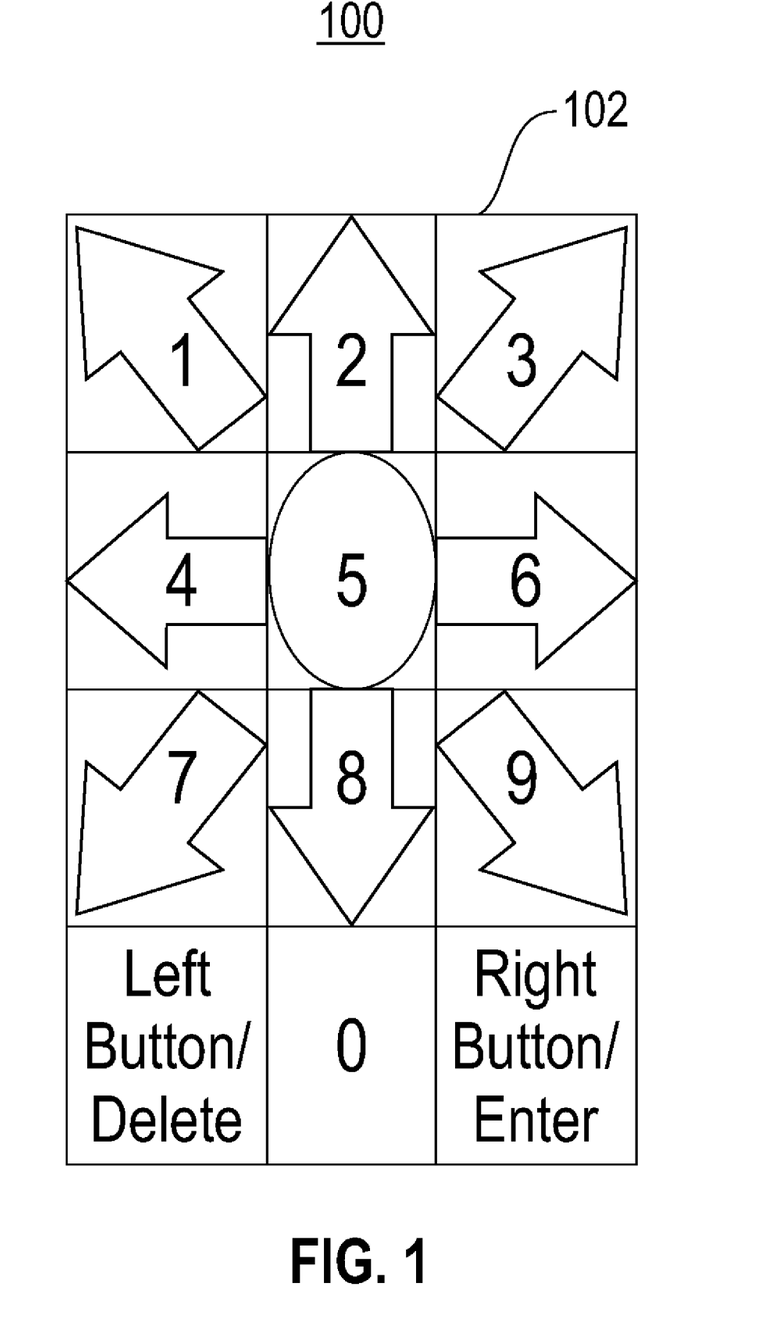
FIGS. 1A and 1B illustrate a front view and a side view, respectively, of an identification badge in accordance with the principles of the invention.
Figure 1B:
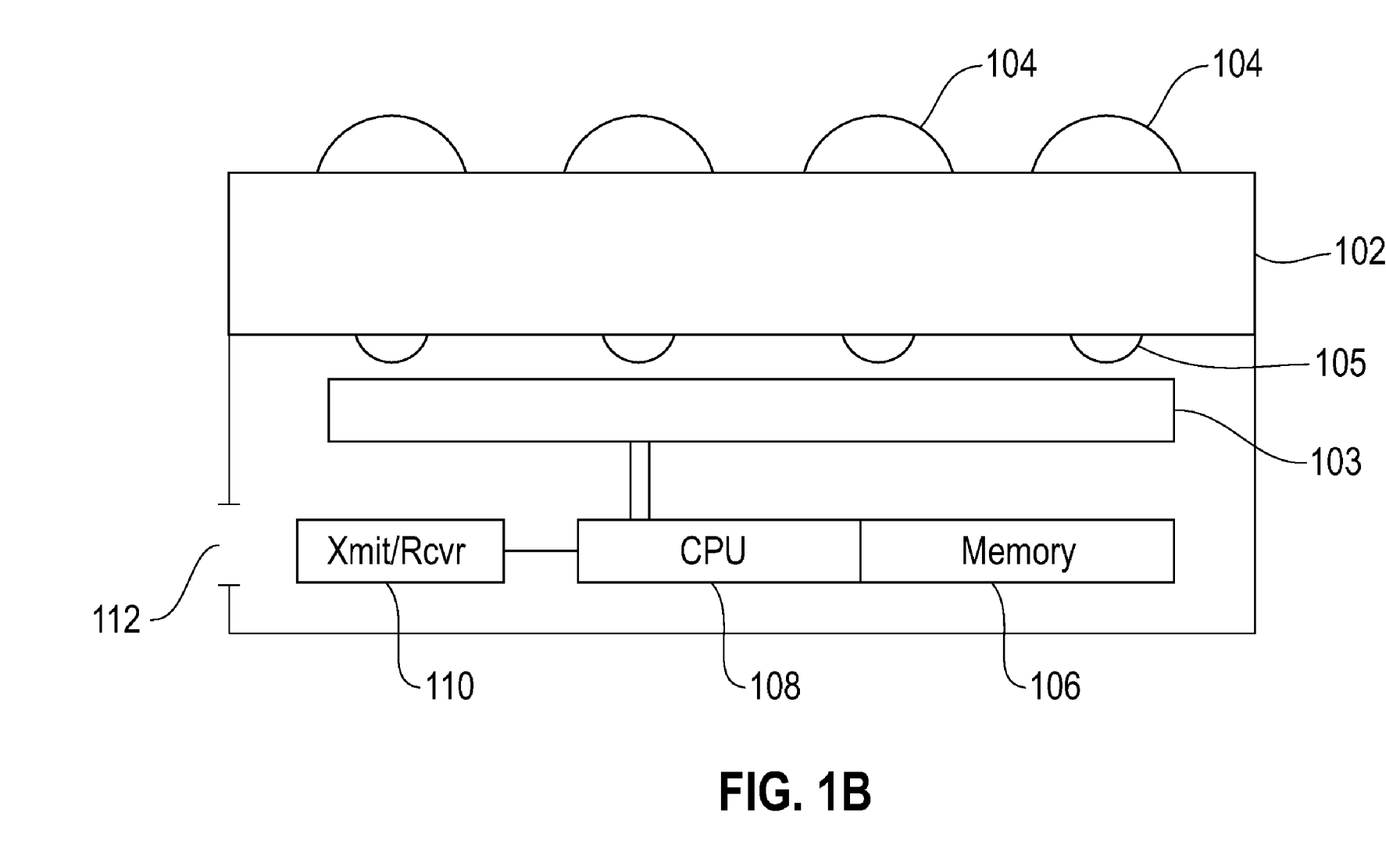

FIG. 1B illustrates a side view of an exemplary identity verification badge 100 in accordance with the principles of the invention. In this exemplary view, keys 104 may be placed on the surface of faceplate 102. Keys 104 can represent one column of the numeral keys (e.g., numbers 3, 6, 9, Right Button) shown in FIG. 1A. Either keys 104 or faceplate 102 can represent a flexible member that depresses when an external force is applied thereto. The flexible action of the keys or faceplate 102 may engage a corresponding switch 105 that may close a circuit on an electronic circuit board 103. The electronic circuit board can provide an indication as to which switch was depressed. The information regarding which switch was depressed can be provided to processor 108. The processor 108, receiving the key depression information, and determining a duration of key depression (or number of depressions within a known time), can determine an action to be performed. That is, the key depression represents a numerical value or a command action based on the time or number of depression of a key that is detected as previously described. In one aspect, the determined action may be provided to a transmitter/receiver 110 to cause the transmission of the determined action outside badge 100 via opening 112. Transmitter/receiver 112 may be selected from a technology such as ultrasonic, RF, optical and infrared.

Memory 106 can be in communication with processor 108. Memory 106 may include code or software instruction, which when accessed by processor 108, enables processor 108 to operate in accordance with a preprogrammed and desired manner. Operation of keypads is well-known in the art and further detailed discussion need not be made herein.

Memory 106 may further include a prestored, fixed, badge identification value. This value can uniquely identify the badge. Memory 106 may further include a personal identification number (PIN) that is provided, and preferably known only by an authorized user. The establishment and use of PINs is well known in the art and need not be discussed herein.

Figure 2:
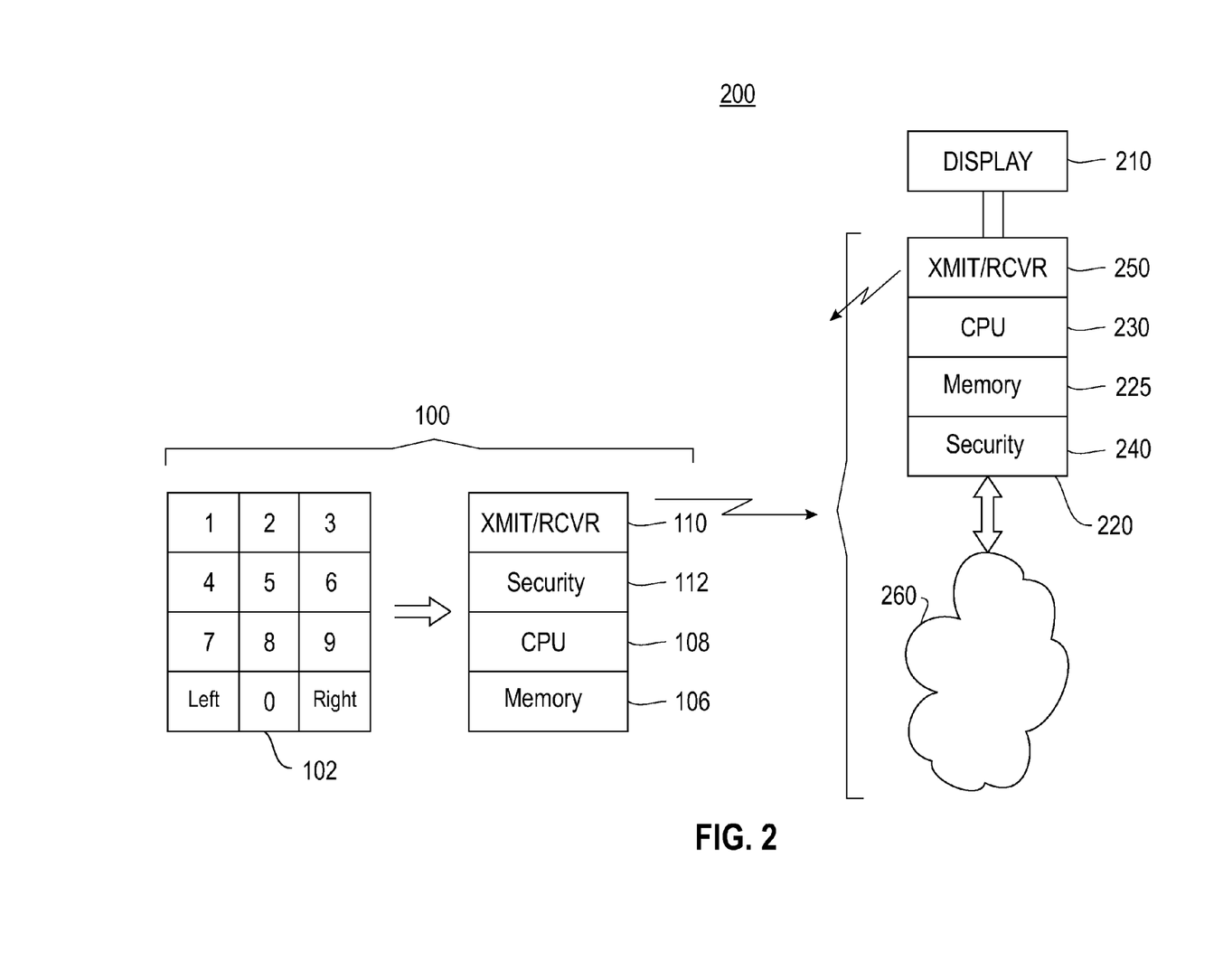
FIG. 2 illustrates an exemplary security system incorporating the identification badge of FIGS. 1A and 1B in accordance with the principles of the invention.

FIG. 2 illustrates an exemplary system 220 that may utilize badge 100 shown in FIG. 1A. In this illustrated exemplary system, badge 100 is shown with keypad 102 in communication with elements memory 106, CPU or processor 108, and transmitter/receiver 110, as previously described. Processor 108 is further in communication with security module 112. Security module 112 determines the validity of a user by comparing inputs provided by keypad 102 with a PIN value stored in memory 106.

Badge 100 may be in communication with computer system 220, either directly or via a network 260. For example, network 260 may be a local area network, such as a WiFi network, that allows communications over a limited range, or pubic network, such as the Internet.

Computer 220 may include memory 225, CPU 230, security mode 240, and transmitter/receiver 250. Computer 220 may further include display 210. Display 210 may be an external device, such as that associated with a desktop computer, or an internal device, such as that associated with a laptop computer. Transmitter/receiver 250 may provide duplex communication with a corresponding transmitter/receiver 110 in badge 100 or may provide communication with network 260.

Computer 220 may further be in communication with a network 260, via well known wire-ed or wireless (e.g., WIFI) protocols. The network 260 may be a local area network (LAN), a wide area network (WAN), or even a public network, such as the Internet. In the case of the Internet, communication may be performed in accordance with a Virtual Private Network (VPN) protocol so as to provide secure communication through a public network. VPN protocols are well-known in the art and need not be discussed in detail herein.

Computer 220 may further include a mouse and keyboard (not shown), which are well-known devices, for providing input to computer system 220 and need not be discussed in detail herein.

With regard to a security log-on procedure, computer 220 can include all the necessary security protocols for maintaining a log in to computer 220.

Figure 3:
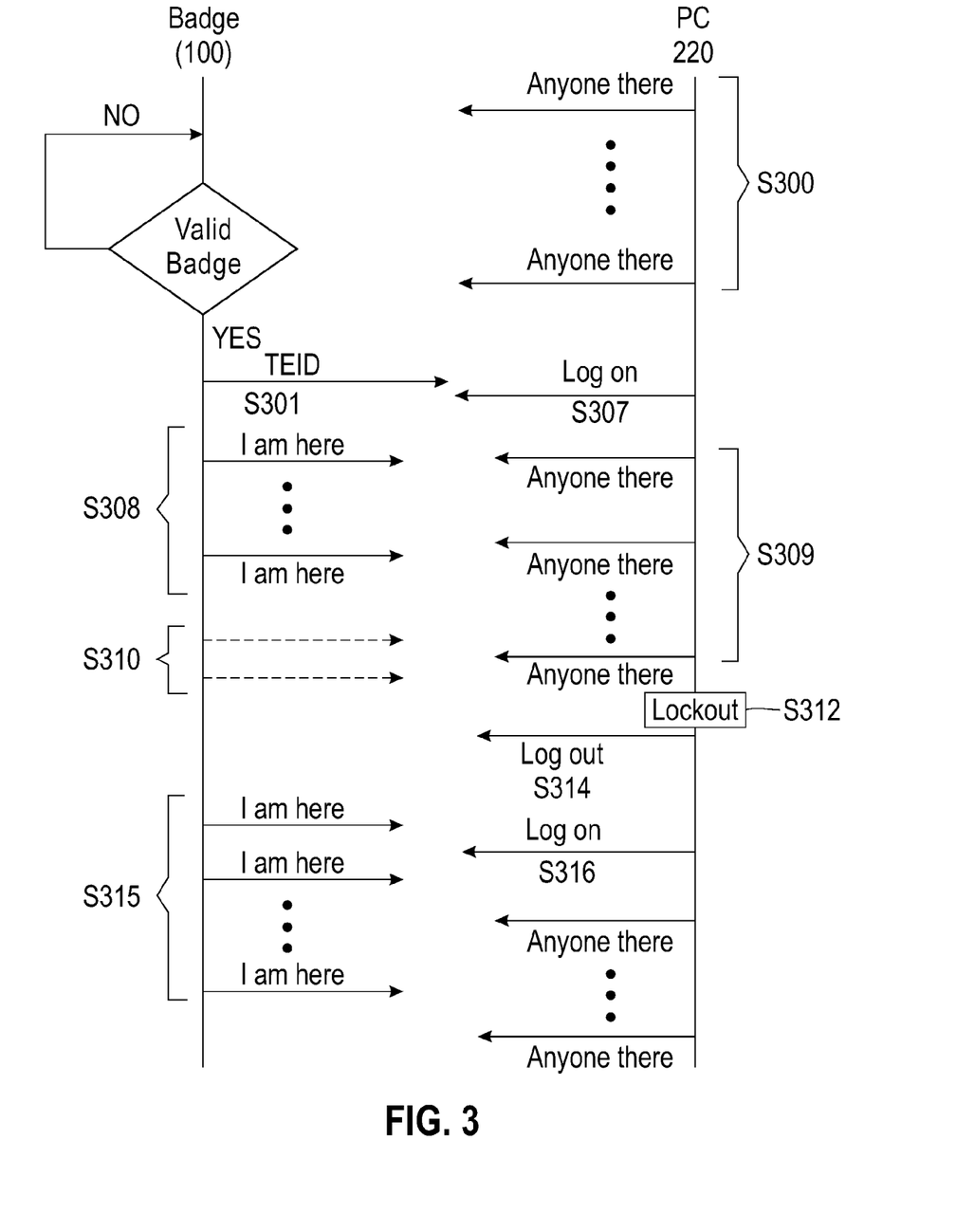
FIG. 3 illustrates an exemplary timing diagramming of communication in accordance with the principles of the invention.

FIG. 3 illustrates an exemplary timing diagram of the operation of identification badge and security protocol in accordance with the principles of the invention. In this illustrated example, the computer system 220 (PC) may continually output a discovery signal ("anyone there") at S300. Badge 100, in response to the detection of the discovery signal, determines whether it is in a valid mode by determining whether a user has entered a valid PIN value, via keypad 102 and that the badge 100 is in the physical presence of the user. If the badge is not in a valid mode, then badge 100 fails to respond to the received discovery signal.

Otherwise, when badge 100 is in a valid mode, an encrypted user ID (TEID) signal is transmitted at step S301. The TEID signal may be composed of at least a badge identification code that is stored in memory 106. The badge identification code uniquely identifies the badge. The TEID may also include a time value. The TEID accordingly may include other information associated with the badge 100. The TEID may be encrypted to prevent unauthorized interception of the transmitted code. Encryption techniques are well-known in the art and need not be discussed herein.

Upon receipt of the TEID signal, PC 220 may transmit a logon signal at step 307. In response to receipt of the logon signal, badge 100 may issue an indication that a successful logon has occurred. The logon indication may be either audio or visual or a combination of audio and visual. For example, a single beep or a unique tone may be used to indicate a successful logon.

Badge 100 may continue to transmit TEID signals or other signals uniquely identifying badge 100, represented as "I am here" signals (step S308) to PC 220 autonomously on a periodic basis after a successful logon has occurred or may transmit TEID signal (step 308) in response to continually transmitted discovery signal (step 309). The discovery signals may be transmitted on a periodic basis.

PC 220 may continue to monitor and receive TEID signal on a periodic basis and, thus, maintain the user with a logged-in status. However, after at least two expected TEID signals are not received (step S310), PC 220, may determine that badge 100 is no longer within a receiving distance and may initiate a lock-out of the user (step S312). PC 220 may further issue a lockout signal (at step 314) to badge 100. Badge 100, in receipt of a lockout signal, may issue a lockout indication. The lockout indication may be audio, visual or a combination of audio and visual. For example, an audio indication may be a beep or a tone that is different than the logon indication.

Although not shown in detail, PC 220 may be continually transmitting the discovery ("anyone there") signal and badge 100 may be continually transmitting the valid badge identification ("I am here") signal. However, because the PC 220 and badge 100 are outside their respective receiving ranges, badge 100 remains locked-out from access to PC 220.

Eventually, badge 100 may return within a receiving distance of PC 220 and a transmitted TEID signal (step S315) may be received by PC 220. PC 220, upon receiving the TEID signal, may then determine the user was previously logged-on and is currently locked-out, and transmit a logon signal (step S316). PC 220 further may unlock the computer system and allow access to the user associated with badge 100. As described previously, badge 100 may continue to transmit TEID signal (S315), either autonomously or in response to a "anyone there" signal. Access to PC 220 may continue as long as badge 100 and PC 220 remain in communication with each other. Alternative, when badge 100 is again within range of PC 200, badge 100 may receive a discovery signal and respond with the appropriate "I am here" message.

Figure 4:
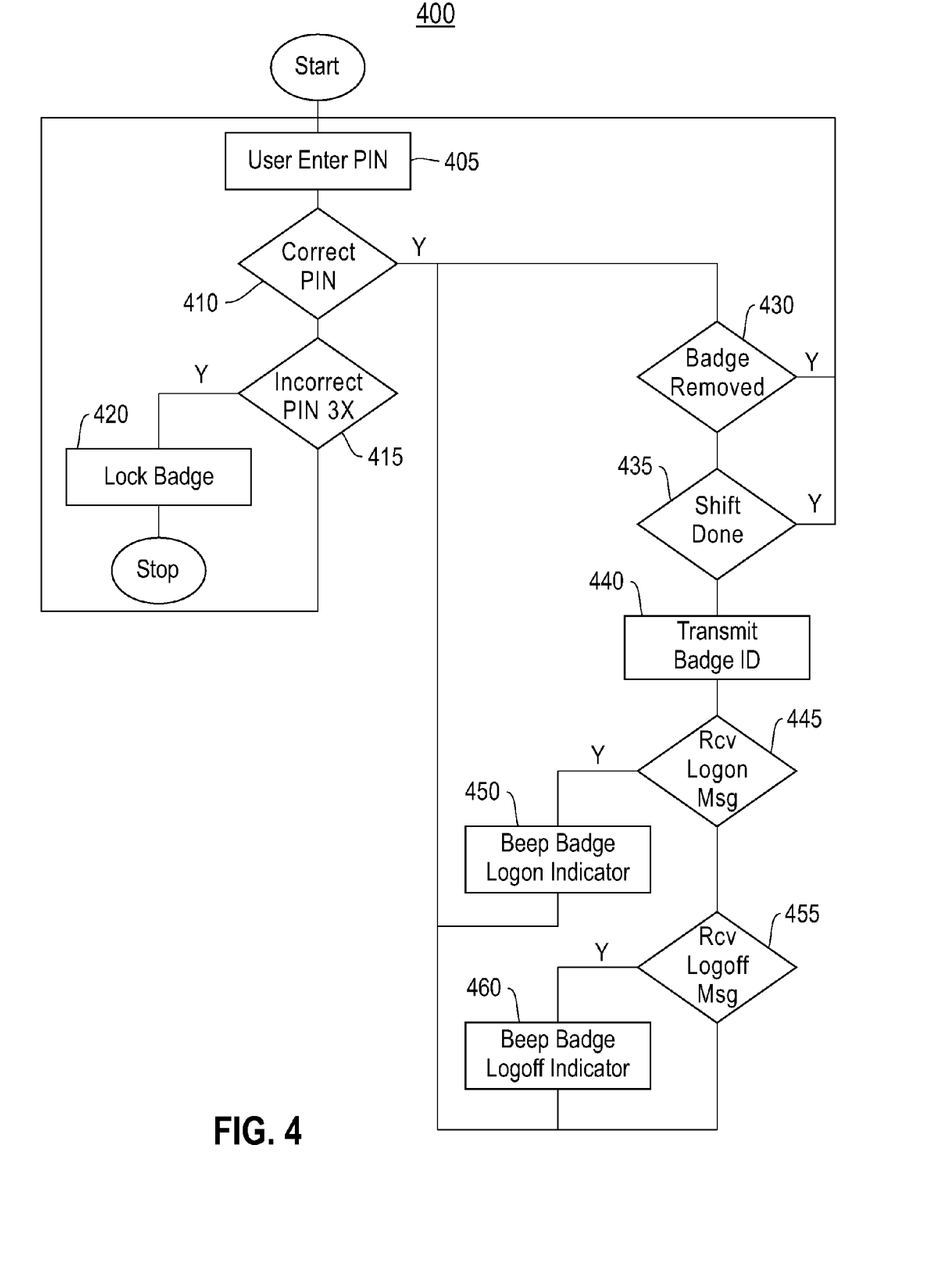
FIG. 4 illustrates a flow chart of an exemplary method utilizing the identity badge of FIGS. 1A and 1B in accordance with the principles of the invention.

FIG. 4 illustrates a flow chart of an exemplary security protocol method 400 in accordance with the principles of the invention. In this illustrated example, a user enters a PIN at block 405 using the keypad 102 on badge 100. At block 410 a determination is made whether the entered PIN value is the same as a PIN value stored in memory 106 of badge 100. If the entered PIN value is incorrect or fails to match the stored PIN value, a determination is made at block 415, whether a known number of successively incorrect entered PIN value have been determined. If the number of incorrectly entered PIN values exceed a predetermined number (illustrated as 3 times—3×), then further entry of input information at badge 100 is denied. This denial of data entry or lockout may be for a predetermined period of time or may require a reset of the information within badge 100. Otherwise, when a correct PIN value has been entered and verified, at block 410, an indication of the matching PIN is retained and processing may continue at block 430.

At block 430, a determination is made whether badge 100 has been removed. If it is determined that badge 100 has been removed, then processing returns to block 405 for entry of a PIN value. Otherwise, a determination is made, at block 435, whether a known time period has expired. For example, the time period may be associated with a user's valid work shift or may be associated with a known number of hours or may be associated with an absolute time (e.g., 24 hours). If it is determined that the time period has expired, then processing may continue at block 405 wherein a PIN value is required to be entered.

Otherwise, a TEID signal is transmitted at block 440. As described in FIG. 3, PC 220 monitors the TEID signal and transmits a logon message. When a logon message is received, block 445, a logon indication is transmitted at block 450. Processing may continue at block 430 to determine whether badge 100 has been removed.

As described with regard to FIG. 3, PC 220 and badge 100 remain in communication via the "anyone there" and "I am here" signals. However, when PC 220 fails to receive a predetermined number of "I am here" messages, a logoff process is initiated to prevent access to the computer system. Similarly, badge 100 in not receiving at least two signals from PC 200 may interpret such failed receptions (block 455) as being a disconnect from PC 220 and generate a logoff signal at block 460. As previously described, logon and logoff indications may be the same or different audio, visual or a combination of audio and visual indications. Processing may continue at block 430 to determine whether badge 100 has been removed.

Although not shown it would be appreciated that the process shown in FIG. 4 may be further expanded to include additional criteria for allowing access to a system from which a user was locked out. For example, the processing shown in FIG. 4 may be referred to a "One PIN a day" method, wherein after an initial logon, badge 100 remains validated (excluding the removal of the badge from a user's physical presence) for an entire day. That is, the One-PIN a day access process may require an initial PIN or password for initial access to the system. After a lockout condition has occurred, only a valid TEID, which is already stored in badge 100, is required to obtain access. A new PIN may be required at the start of each new day. In this case, the "shift" in block 435 may refer to a 24 hour time period.

In another aspect, a limited number of accesses during a predetermined time period may be imposed. This method, referred to as Nth-Pin access, requires an initial PIN for initial access to the computer system 220 and after a lockout condition occurs, only a limited number (N) of valid accesses are may be allowed. In this case, after N lock outs during a predetermined time period, entry of the user's PIN value is required to revalidate badge 100.

In still another aspect, a Time-of-Day (TOD) access process may be implemented. A TOD access process requires a PIN for initial access and during a predetermined time from the initial access only a valid TEID is required to obtain access after a lockout condition occurs. However, after the predetermined time, then the badge is rendered invalid and entry of the user's PIN value is required to validate the user and the badge.

In still another aspect of the invention, badge 100 may include a body detector that monitors the status of badge 100. The body detector may detect when badge 100 is being worn by the user and when badge is not being worn by the user. The body detector may comprise one of a clip sensor, a strap sensor, a tilt sensor a badge sensor or a combination of such detectors.

Figure 5A:
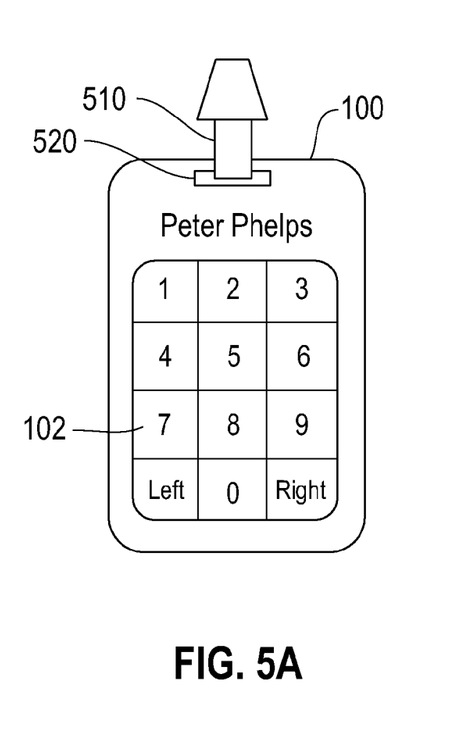
FIGS. 5A-5D illustrate an exemplary identification badge in accordance with the principles of the invention.
Figure 5B:
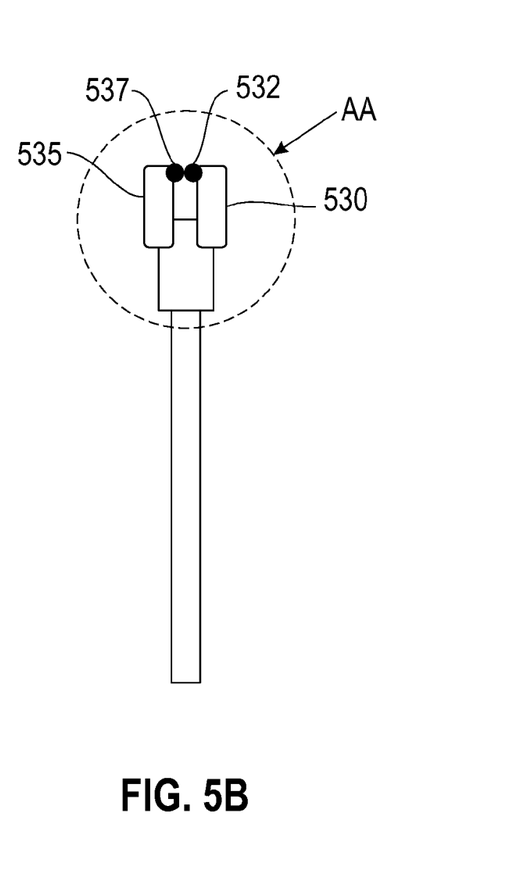
Figure 5C:
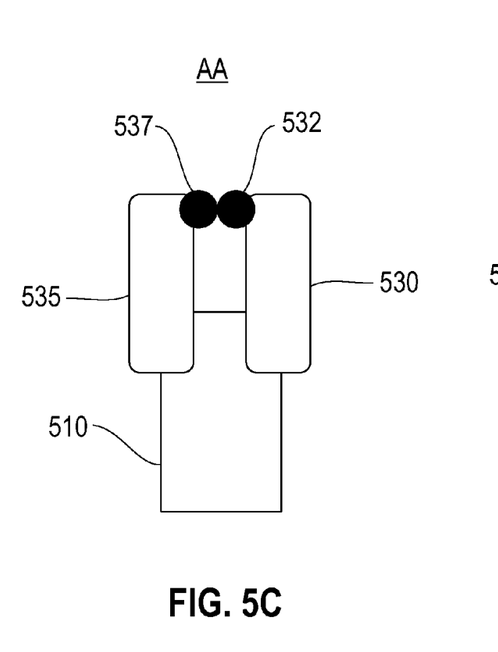
Figure 5D:
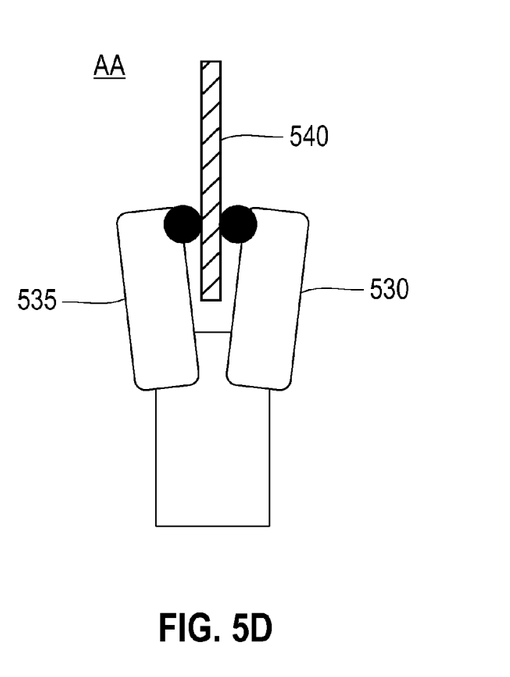

The clip sensor may comprise a clip that holds badge 100 to a shirt or blouse. Two contacts attached to the inner surfaces of the clip can be held apart by the presence of the material of a shirt or blouse. When the clip is removed, the contacts touch and indicate that the badge has been removed from the user's presence. FIG. 5A illustrates a front view of badge 100 including faceplate/keypad 102. Badge 100 includes a clip 510 that is attached to slot 520 in blade 100. FIG. 5B illustrates a side view badge 100 and clip 510 showing two hinged arms 530 and 535 that may be spring loaded (not shown) causing metallic contact points 532 and 537 to make an electrical contact. When a user squeezes the lower portion of clip 510, arms 530 and 535 are separated such that a fabric may be inserted between metallic contacts 532 and 537. FIG. 5C illustrates an expanded view of clip 510 in a closed position. FIG. 5D illustrates an expanded view of clip 510 wherein fabric 540 is inserted between metallic contacts 530, 535. In this case, an open circuit is formed between the metallic contacts and the badge is deemed to be in the possession of the user.

Although not shown, it would be recognized that an electrical connection between metallic contacts 530, 535 and processor 108 (FIG. 1B) enables information regarding the status of the metallic contacts to be sensed by processor 108.

Figure 6:
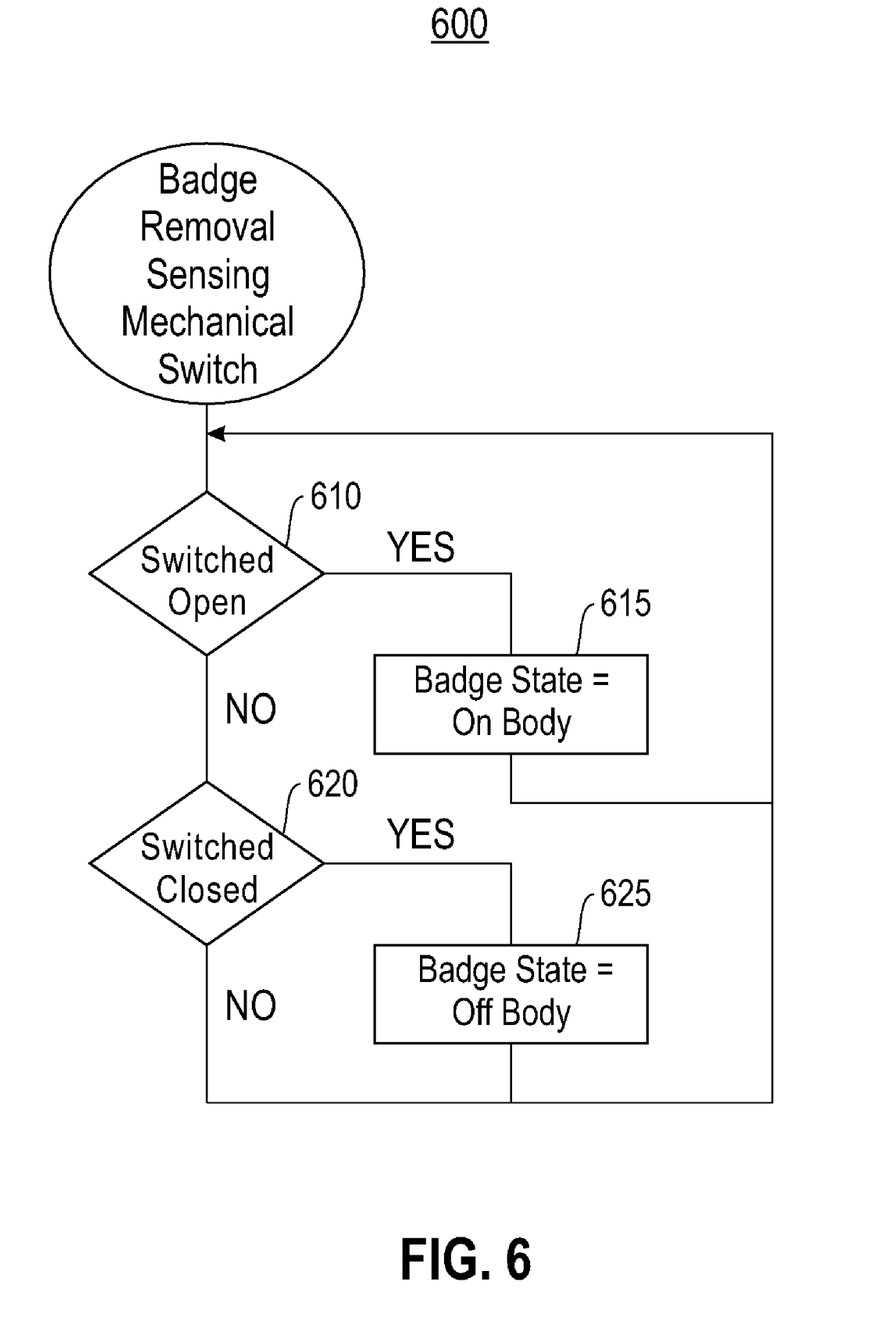
FIG. 6 illustrates a flow chart of an exemplary method for determining a status of an identification badge in accordance with the principles of the invention.

FIG. 6 illustrates an exemplary process 600 for determining the status of the body detector, such as by using the metallic contact badge shown in FIGS. 5A-5D. In this illustrated process, a determination is made at block 610 whether the metallic contacts are in an open position or state (FIG. 5D). If the answer is positive, then badge 100 may be deemed to be attached to the user at block 615. Otherwise, a determination is made at block 620 whether the switch is in a closed position. If the answer is positive, then badge 100 may be deemed to not be attached to the user at block 625. The status of the body detector may be monitored at block 430 of FIG. 4.

Figure 7A:
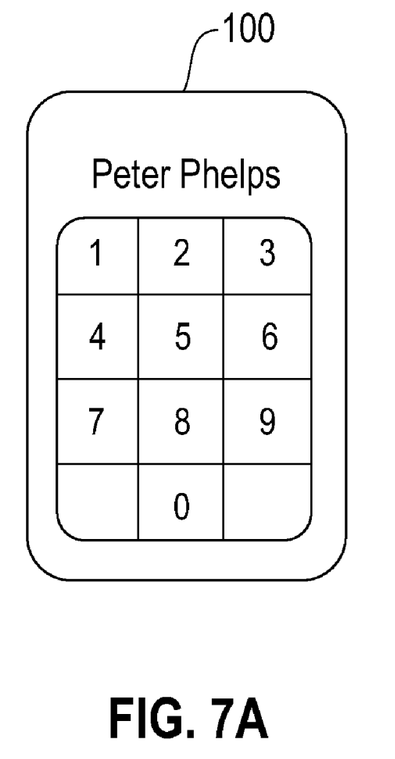
FIGS. 7A-7B illustrate a second exemplary identification badge in accordance with the principles of the invention.
Figure 7B:
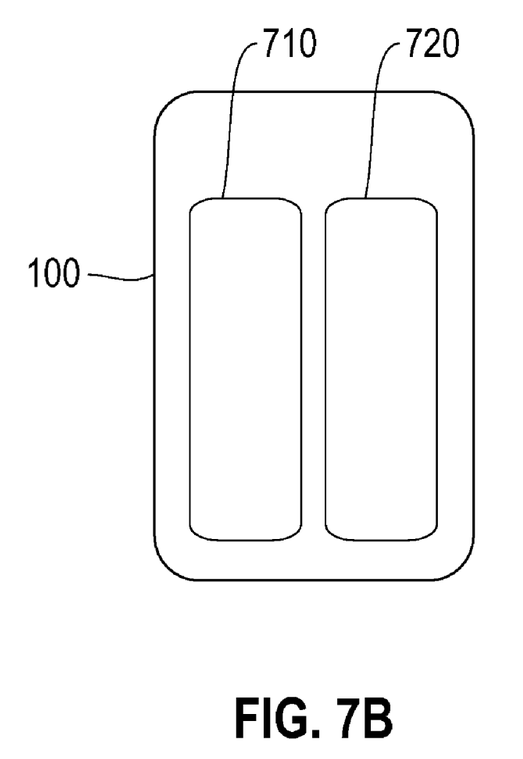

FIGS. 7A and 7B illustrate a capacitance badge sensor in accordance with the principles of the invention. FIG. 7A illustrates badge 100 including keypad 102. FIG. 7B illustrates an internal view of badge 100 showing capacitive sensing elements 710 and 720. Although not shown, it would be recognized that the information regarding the capacitive sensing elements is provided to processor 108 (FIG. 1).

Figure 8:
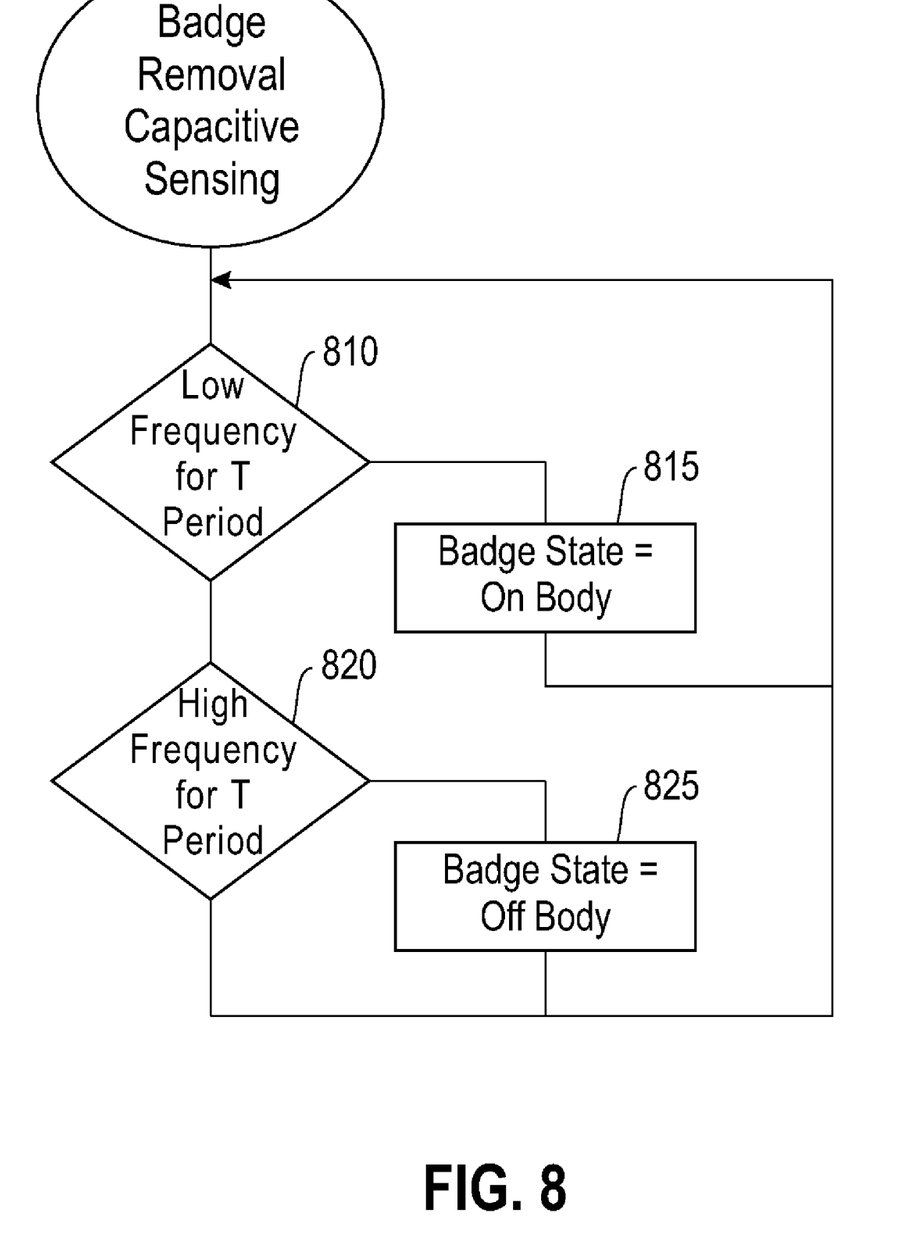
FIG. 8 illustrates a flow chart of an exemplary method for determining a status of identification badge in accordance with the principles of the invention.

FIG. 8 illustrates an exemplary process 800 for determining the status of the body detector using the capacitive sensing shown in FIGS. 7A and 7B. In this illustrated process, a determination is made at block 810 whether a low frequency output is detected by processor 108 for a predetermined time period (T). If the answer is positive, then badge 100 may be deemed to be attached to the user at block 815. Otherwise, a determination is made at block 820 whether a high frequency output is detected by processor 108 for a predetermined time period. If the answer is positive, then badge 100 may be deemed to not be attached to the user at block 825. The status of the body detector may be monitored at block 430 of FIG. 4. Monitoring of the capacitance for a predetermined time period T is utilized to avoid incorrect determination of the state of badge 100 due to movement of badge 100.

Figure 9:
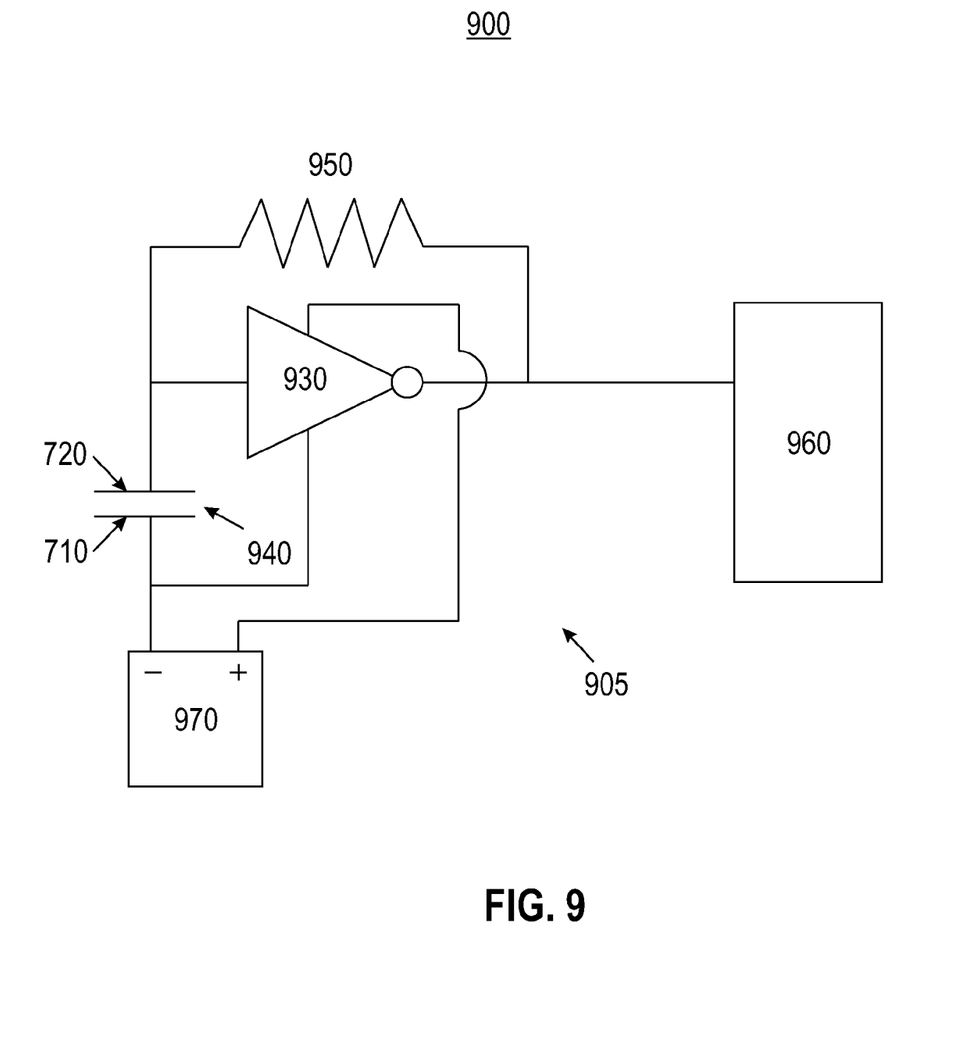
FIG. 9 illustrates an exemplary capacitance circuit for determining a status of an identification badge in accordance with the principles of the invention.

FIG. 9 illustrates an exemplary capacitive sensing circuit for determining a status of badge 100. Capacitance 940 is caused by the electrical impedance between contacts 710 and 720. When badge 100 is near, or worn by, a user, capacitance 940 is relatively high due to the conductive dielectric caused by the abundance of water and ions in the human body. When badge 100 is removed from the user's person, the capacitance reduces dramatically.

Inverter 930 oscillates at a known frequency that is determined by the values of capacitance 940 and resistance 950. As capacitance 940 increases, the output frequency decrease and when the capacitance 940 decreases, the output frequency increases. The output frequency is measured by processor 960 and the state of badge may be determined as shown in FIG. 8. A power supply 970 provides sufficient voltage to inverter 930 (e.g., 74HC14 Schimittt Trigger inverter). Power supply 970 may correspond to a power supply powering processor 960/108 or may be an independent power supply, such as a battery.

Figure 10:
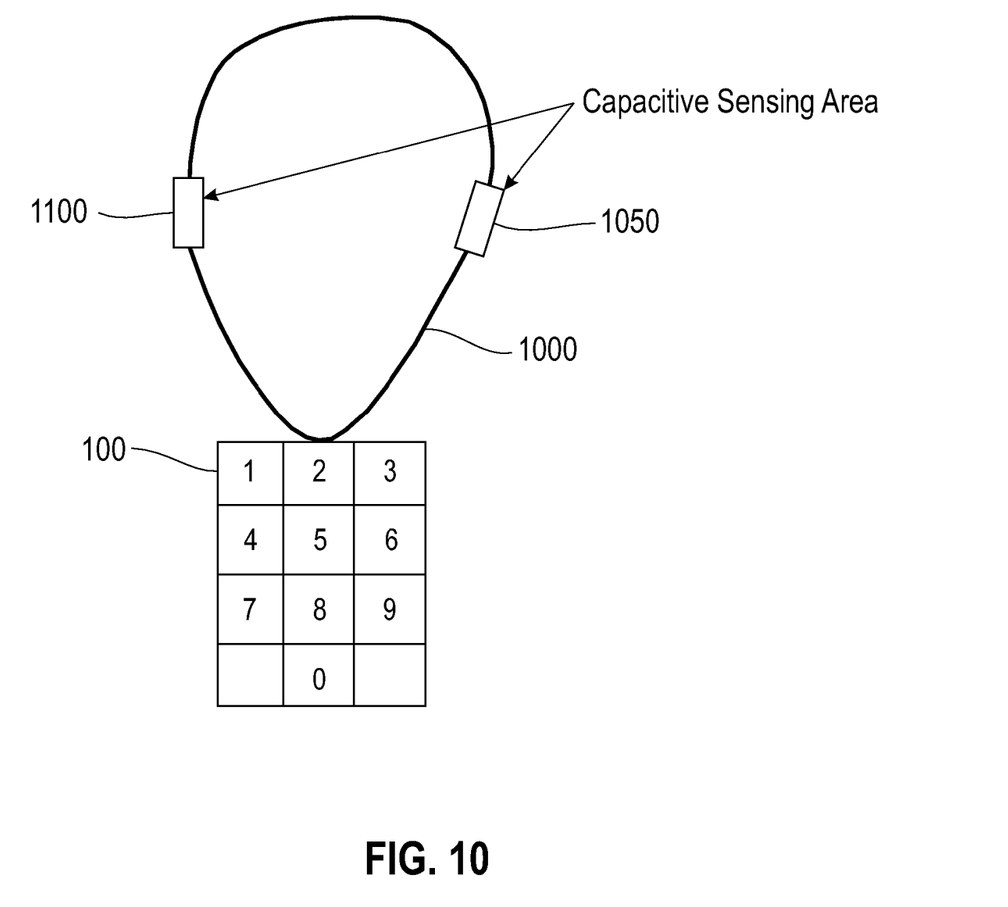
FIG. 10 illustrates a third exemplary identification badge in accordance with the principles of the invention.

FIG. 10 illustrates another example of a capacitance sensor. In this case, the sensor is incorporated into strap 1000 that is attached to badge 100. Strap sensor 1000 may comprise two pieces of wire that clasp behind the neck. The wire is electrically shielded except for two sections, 1050, 1100, halfway along the lengths of the wires. The strap sensor measures the capacitance between the non-shield portions of the wire. When the user is wearing the badge, there is a larger capacitance than when the badge is resting on a non-conductor. Only two small sections of the wire sense capacitance to better detect when a human body is substantially near the sensing wires.

A tilt sensor, such as an LSI302DL 3-axis accelerometer available from STMicroelectronics, may be used as a body detector. In this case, when the badge is determined to be in a horizontal position for a known period of time, it may be determined that badge 100 has been removed from the body.

Badge 100, and the method and system described herein, is advantageous as it allows for a less burdensome access to computer systems while limiting contact with the devices that the user comes in contact with. For example, in a hospital situation the prevalent pathways for infectious diseases into the bloodstream (IV lines, wounds, stitches) and a variety of virulent ambient germs creates the conditions for nosocomial inflections (also known as hospital-acquired infection). Hospital care workers (HCW) are often in contact with computer keyboards or mice that are touched by a plurality of HCWs. This creates a germ transfer point that could spread an infectious disease. To overcome this situation, the HCWs are required to constantly wash their hands with an antibacterial soap or lotion. However, sometimes washing of the hands is not practical. Accordingly, by limiting the need to touch a keyboard or mouse to gain access to the computer system or to perform some work on the computer system by utilizing badge 100 and the security protocols described herein, a significant means for the transfer germs is avoided.

In addition, as discussed briefly, by utilizing the movement control keys and the special keys (see FIG. 1A) a user may further limit the need to use a computer keyboard and mouse to navigate about applications available on computer 220. For example, a long depression of, for example, key 4 may cause PC 220 to move a cursor displayed on display 210 to the left in a manner similar to the left arrow key on a keyboard. Similarly, a long depression of the Right Button/Enter may cause computer 220 to respond as if the Enter key was depressed on the keyboard. Such command processes are well-known in the art wherein an operating system, e.g., Windows® and Leopard®, responds to arrow key or mouse inputs to position a cursor about a display screen. Windows is a registered trademark of MicroSoft Corporation, Bellevue, Wash., and Leopard is a registered trademark of Apple Corporation, Cupertino, Calif.

As can be appreciated by those skilled in the art, the present invention provides an improved device and method for providing less burdensome access to secured computers with better protection and limited contact with external components.

It should be understood, of course, that the foregoing relates to exemplary embodiments of the invention and that modifications may be made without departing from the spirit and scope of the invention as set forth in the following claims.

What is claimed is:

1. An identity verification badge comprising:
   a sensor configured to determine and output a status of said badge;
   a keypad assembly having a faceplate including a plurality of data entry keys, said keys allowing for entry of at least one numeral value;
   a processor in communication with said sensor, said keypad and a memory, said memory including an identification code of said badge and a personal identification number associated with a user; said processor being configured to:
   receive an input value comprising at least one value from said keypad;
   determine whether the received input value corresponds to said personal identification number;
   retain an indication of matching said personal identification number; and
   a transmitter/receiver in communication with said processor,
   the processor being configured to output an access signal upon receipt of a command action through the transmitter/receiver, wherein the access signal is maintained for a shift, to lock out the badge if the sensor indicates that the badge has been removed from the user, the access signal including at least said badge identification code when the received input value corresponds to said personal identification number and the output status of the badge is determined to be in a validated state and to output the access signal when the output status of the badge transitions from an invalidated state to the validated state within a predetermined time period without receiving any additional numerical input value from the keypad.

2. The badge as recited in claim 1, wherein said access signal is encrypted.

3. The badge as recited in claim 1 wherein said processor is configured to inhibit transmission of said access signal when the output status of the badge is determined to be in an invalidated state.

4. The badge as recited in claim 3, wherein the processor is configured to:
   determine when the output status of the badge transitions from the invalidated state to the validated state; and
   request through the transmitter/receiver the input value from the user upon said determination.

5. The badge as recited in claim 1, wherein the processor outputs said access signal in response to a received external signal.

6. The badge as recited in claim 1, wherein the processor outputs said access signal periodically.

7. The badge as claimed in claim 1, wherein said transmitter/receiver is of a type selected from the group consisting of: ultrasonic, RF, optical, electric field, magnetic field and infrared.

8. The badge as recited in claim 1 including a body detector coupled to the sensor, the body detector including at least one of a clip, a tilt switch, and a capacitance measurement device.

9. The badge as recited in claim 1, wherein the processor requests entry of the input value from the user after a predetermined time period expires.

10. The badge as recited in claim 1, further comprising:
    an indicator for providing an indication of a receipt of an external logon signal.

11. The badge as recited in claim 10, wherein said indication includes at least one of an audio indication and a visual indication.

12. The badge as recited in claim 1, wherein said processor is configured to generate an indication of the badge being in the validated state at predetermined intervals.

13. The badge as recited in claim 1, wherein said faceplate keys are dual-entry keys for entering numerical data and command data.

14. The badge as recited in claim 13, wherein said numerical data is determined when a key depression occurs for a time less than a predetermined time.

15. The badge as recited in claims 13, wherein said command data is determined when at least two depressions of the same key occur within a predetermined time.

16. A system for managing a logon security protocol to a computer system transmitting a discovery signal, said system comprising:
    an identification badge;
    a body detector coupled to the identification badge and configured to detect the identification badge's being worn by a user, the identification badge including:
    a keypad configured to receive at least one numerical input value;
    a transmitter/receiver configured to detect the discovery signal;
    a processor in communication with a memory and with the transmitter/receiver; said processor being configured to:
    receive a badge status indication;
    receive the at least one numerical input value from the keypad;

compare the at least one numerical input value with a personal identification number stored in said memory;

determine whether the at least one numerical input value matches said personal identification number;

provide a user identification signal from the transmitter/receiver to the computer system, wherein the user identification signal indicates a valid logon status to a computer in communication with the computer system;

lock out the user if the discovery signal is not received within a predetermined time period; and allow the user to access the computer system without receiving any additional numerical input value from the keypad if the discovery signal is again received within another predetermined time period.

17. The system as recited in claim 16, wherein the processor requests entry of the numerical input value by the user when the identification badge transitions from the valid logon status to an invalid logon status.

18. The system as recited in claim 16, wherein said processor is further configured to inhibit transmission of the user identification signal when the identification badge transitions from the valid logon status to an invalid logon status.

19. The system as recited in claim 16, wherein the valid logon status indicates detection of the identification badge's being worn by the user.

20. The system as recited in claim 16, wherein the transmission of the discovery signal occurs periodically.

21. The system as claimed in claim 16, wherein said transmitter/receiver is of a type selected from the group consisting of ultrasonic, RF, optical, electric field, magnetic field and infrared.

22. The system as recited in claim 16, wherein said body detector includes at least one of a clip and a capacitance measurement device.

23. The system of claim 16, wherein the discovery signal is sent periodically and the badge status indication is sent in response to each detected discover signal.

24. A method for managing a validation badge logon security protocol comprising:

receiving a status indication of a body detector;

receiving a numerical input value;

comparing said numerical input value with a prestored identification value that uniquely identifies a user;

transmitting a user identification signal that uniquely identifies said validation badge when said numerical input value corresponds to said prestored identification value;

validating a login to a computer using the logon security protocol based on the user identification signals uniquely identifying said validation badge and based on the status indication being determined as valid;

determining that said validation badge has moved outside a distance such that the computer does not receive the user identification signal from said validation badge;

determining that said validation badge has returned within a distance such that the computer may receive the user identification signal from said validation badge, that the validation badge was previously logged-on to the computer, and that said validation badge is currently locked out of the computer; and validating a login to the computer using based on the status indication's being determined as valid without receiving another numerical input value.

25. The method as recited in claim 24, including requesting input of the numerical input value when the status indication is determined as invalid.

26. The method as recited in claim 24, including inhibiting transmission of the user identification signal when the status indication is determined as being invalid.

* * * * *